Aug. 15, 1950     H. W. SIMPSON     2,518,824
TRANSMISSION Filed Sept. 16, 1944     9 Sheets-Sheet 1

Fig. 1

INVENTOR
Howard W. Simpson
BY
Barnes, Kisselle, Laughlin
& Raisch
Attorneys

Aug. 15, 1950 H. W. SIMPSON 2,518,824
TRANSMISSION
Filed Sept. 16, 1944 9 Sheets-Sheet 4

INVENTOR
Howard H. Simpson
BY
Barnes, Kisselle, Laughlin & Raisch
Attorneys

Aug. 15, 1950        H. W. SIMPSON        2,518,824
TRANSMISSION Filed Sept. 16, 1944                9 Sheets-Sheet 8

INVENTOR.
Howard W. Simpson
BY
Barnes, Kisselle, Laughlin & Raisch
ATTORNEYS.

Aug. 15, 1950     H. W. SIMPSON     2,518,824
TRANSMISSION Filed Sept. 16, 1944     9 Sheets-Sheet 9

Fig. 25

INVENTOR.
Howard W. Simpson
BY
Barnes, Kisselle, Laughlin & Raisch
ATTORNEYS.

Patented Aug. 15, 1950

2,518,824

UNITED STATES PATENT OFFICE 2,518,824

TRANSMISSION

Howard W. Simpson, Dearborn, Mich.

Application September 16, 1944, Serial No. 554,353

15 Claims. (Cl. 74—763)

This invention relates to a transmission for an automotive vehicle.

Tractor transmissions have not been improved much during the past few years. Spur gears are still used in tractor transmissions. Such gears are noisy which results in nervous strain and fatigue of the operator. The gears are usually larger and have coarser pitch than passenger car gears. This makes shifting difficult as the shift distances are large and the teeth frequently abut, thus requiring constant manipulation of the clutch and much pulling on the shift lever to get the gears into mesh. These are some of the reasons that have made it impractical to put the shift on the steering column as in passenger cars.

Consider the difficulty in handling the conventional tractor transmission when the tractor is operating power take off driven implements such as, a mower, binder, grain combine, potato digger, hay baler, spray rig, manure spreader, etc. With all such implements it is often necessary to stop forward movement because the implement has because the implement has become overloaded or clogged.

To do this it is necessary to shift out of gear and then re-engage the clutch to drive the power take off. Then, when the implement is free, the clutch must be disengaged again to allow shifting into gear, and the clutch re-engaged.

This procedure not only requires six operations which are tiring to the operator because of difficulty with abutting gear teeth as described above, but a large amount of time is lost as the implement drive is stopped during the time the clutch is disengaged. Binding a heavy stand of grain, for instance, is hard on the operator as he is forced to continually operate the clutch and gear shift lever and at the same time make right angle turns at the corners of the field. What the operator would like to do in such cases is to stop the motion of the tractor but let the power take off continue to drive, until the implement is free of obstructions and then to start forward movement of the tractor again with one simple effortless movement of the control.

It is the object of this invention to produce a transmission for an automotive vehicle which is efficient in operation and which can be easily manipulated to satisfy all torque and speed requirement conditions without fatigue to the operator. This object is accomplished by means of an improved planetary transmission in which gear shifting is eliminated in ordinary operation and the speeds changed by means of an easily manipulated finger tip control on the steering wheel. The main advantage of the finger tip control is in changing speeds without disengaging the clutch.

When the operator finds he has to stop the tractor and allow the power take off to keep on running, all he has to do, with the proposed planetary transmission, is to move the speed control lever (at the steering wheel) to neutral. Then, when the implement is running freely again, he moves the lever back again to the desired speed. It is frequently necessary to go to a lower or higher speed in all field work on a farm. To be able to do this without effort will be greatly appreciated by tractor operators. With light loads the tractor will keep right on moving when the speeds are changed, as the clutch is not disengaged.

Farm tractors are used not only in the slow speed field operations such as plowing, but also for high speed hauling on highways. Since the tractor replaces the function of the motor truck when used on the highway, it must be able to travel at fairly high speeds without racing the engine. This requires a transmission with four or five speeds for farm work and a higher range of several speeds for road work. Fortunately these ranges overlap so that a total of six forward speeds ranging from about two to fifteen miles per hour at the governed speed of the tractor engine are sufficient for versatile performance. In ordinary sliding gear transmissions more than four speeds requires extremely long shafts in the transmission so that deflections of the shafts and housing is high when the gears are under heavy load. It is then necessary to use very large diameter shafts which add considerable weight. If an additional sliding gear reduction is used in series with a three speed transmission to obtain six speeds, there is no saving in weight as the extra shafts and bearings add more weight than is saved by being able to use short shafts.

My planetary transmission overcomes the above objections to shaft deflection for, in the type of planetary gearing used, all radial loads from the gears are balanced and expensive ball and roller bearings are therefore not necessary. The gears are also quiet as they are not deflected partially out of mesh by the working loads as is the case in ordinary sliding gear transmissions. Other advantages are compactness and light weight due to balancing of both radial and end thrust loads which reduce the number of bearings required.

Balancing of the thrust of the differential gears is not only an advantage in reducing wear but also greatly reduces braking effort required when making sharp turns and also reduces frictional losses in the differential.

Another advantage of my transmission is in the hydraulic control of the friction members used to obtain various speeds. This is not only simple and compact with all oil passages self-contained, but also gives a very smooth and uniform change from one speed to another or from neutral so that lurching and jerking of the tractor and implement does not occur.

Ordinarily in planetary transmissions a separate set of planetary gears are required for reverse drive but in my transmission the reverse gears are also the low speed gears and fewer parts are thus required.

A known transmission which is used in passenger cars and other vehicles, has four speeds forward and one reverse and contains three trains of planetary gears. Four speeds are not sufficient for tractor work and I have therefore sought to obtain six speeds forward and two in reverse and still use only three sets of planetary gears and have succeeded in doing this by combining the function of the reverse gears with that of the low speed gears.

The transmission comprises a housing 30, a driving shaft 31, a helical gear 32 fixed on the driving shaft 31, a driven stub shaft 33 piloted in the rear end of driving shaft 31, and stub shaft 34 which carries the beveled gear 35.

Two sets of planetary gears are mounted on stub shaft 33. The second speed planetary gear set comprises a planet gear carrier 36 fixed on, and integral with, shaft 33, planet pinions 37 rotatably mounted on pins 38 carried by the planet carrier 36, a ring gear 39 journaled on, and rotatably supported on, stub shaft 33, a sun gear 40 rotatably journaled on stub shaft 33 and splined to sun gear 41 of the second planetary gear set. The second speed planetary gear set also includes a brake drum 42 secured by cap screws 43 on circumferential flange 44 integral with the hollow sun gear shaft 45. The brake drum 42 also has bolted thereto a disc 46 which is journaled on the hollow stub shaft of the ring gear 39 and provided with a plurality of clutch teeth 47 which are arranged to interengage clutch teeth on shiftable ring 48 which are slidably carried on the enlarged hollow end 49 of drive shaft 31. A toothed ring 50 is splined on the hub 51 of ring gear 39 so that drive shaft 31, by means of clutch ring 48, can be interengaged either with the braking disc 46 or through clutch teeth 50 with the internal ring gear 39.

The second set of planetary gears when used alone are the reverse gears of the transmission, the driving member being the sun gear 41 and the driven member being the internal gear 52. Sun gear 41 is splined on hollow shaft 45. A ring gear 52 is splined on stub shaft 33. A planet carrier 53 supports a plurality of planet gears 54 on pins 55. Planet carrier 53 is journaled on stationary bearing 58 supported by cross web 59 in housing 30, on hollow shaft 45, and on the hub of sun gear 41. The planet carrier 53 in this case includes the brake drum 57 and the carrier consists of two halves, the rear half carrying the planet pinions as mentioned and the front half enclosing a multiple disc clutch. The two halves are held together by means of six cap screws 58 and the cap screws act as driving keys for one set of clutch discs 60. The other set of clutch discs 61 are keyed to a hub 62 integral with the sun gear. The front part of the carrier 57 is bored out to form eight cylinders 63 which receive pistons 64. The pistons 64 apply pressure, when oil is directed between them and the bottoms of the cylinders, to the clutch plates through a medium of a presser plate 65 which has eight lugs 66 extending into the eight bores so that the eight pistons can apply an equal pressure to the discs 60, 61. A plurality of compression springs 85 are positioned between presser plate 65 and ring carrier 53. Springs 85 act to release the disc clutch 60, 61 when oil pressure is released from in front of piston 64.

Figure 1:
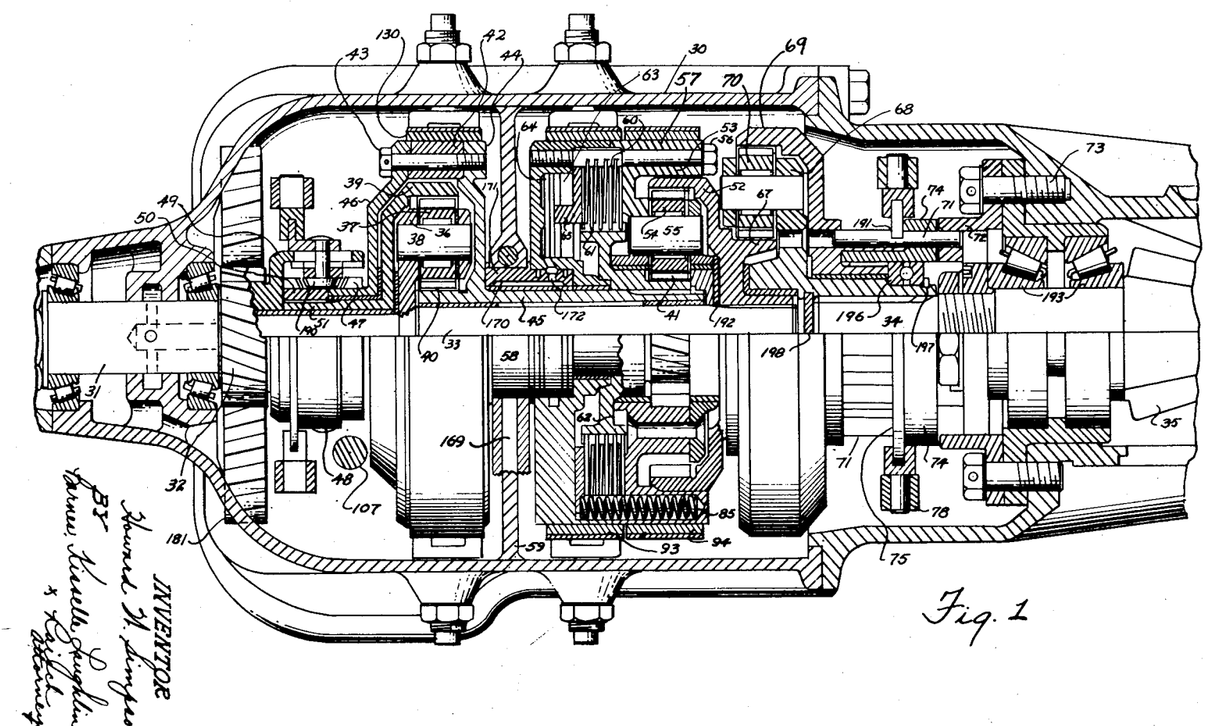
Fig. 1 is a top plan or horizontal section through my transmission.
Figure 2:
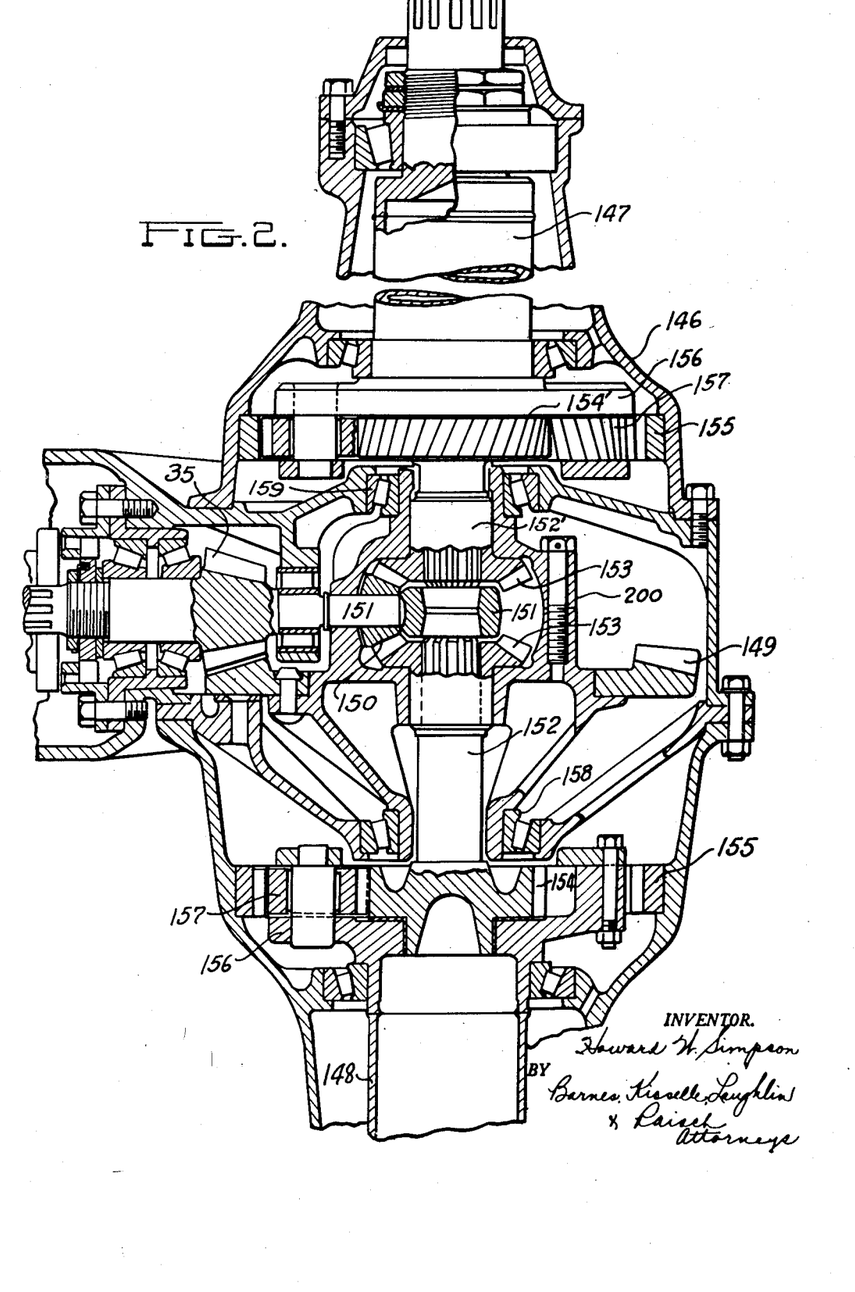
Fig. 2 is a continuation of the right hand end of Fig. 1 and comprises also a top view or horizontal section through the rear end of the transmission including the differential and planetary gear transmission for the tubular rear axle.
Figure 18:
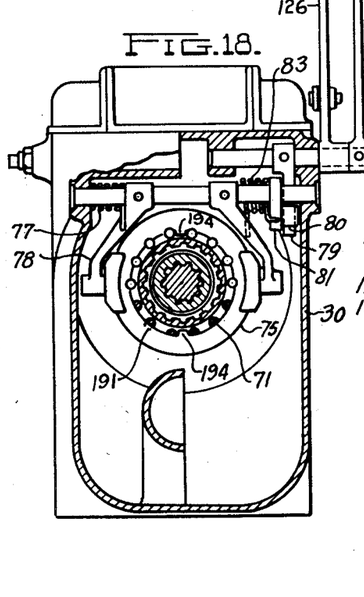
Fig. 18 is a double section along the line 18—18 of Fig. 9.

An underdrive is located directly to the rear of the reverse planetary gears. The sun gear 67 of this set is cut on a hub of the internal gear 52 of the reverse set. The driven member of the underdrive is the planet carrier 68 which is splined to the output shaft 34 which is also the shank of bevel pinion 35. The ring gear of the drive is referenced 69 and the planet gears 70. The underdrive can be shifted in or out of gear by means of a multiple pin clutch and brake 71. In the top view section, Fig. 1, of the transmission the pins 71 are shown shifted to the rear, in which position they lock the internal gear 69 to the housing, thus, in this particular transmission, by way of illustration, giving a reduction of about 2.8 to 1. The stationary member 72 is secured by cap screws 73 to the housing 30. The guide ring 74 for pin 71 is splined to the hub of the internal gear 69. A shifter ring 75 inter-engages all of the pins 71 in notches 191 (Fig. 1). When the pin clutch and brake is shifted forward it connects the carrier 68 to the internal gear 69 so that the entire underdrive planetary set rotates as a solid mass. The fourteen pins which comprise the driving elements of the clutch and brake are shifted in unison by means of the ring 75 which fits into a notch in each of the pins, as shown in Fig. 18 where several of the lower pins are shown in section, and provides a simple and compact arrangement for shifting. Keys 194, integral with ring 75, force the ring to turn with the pins, as shown in Fig. 18.

Figure 9:
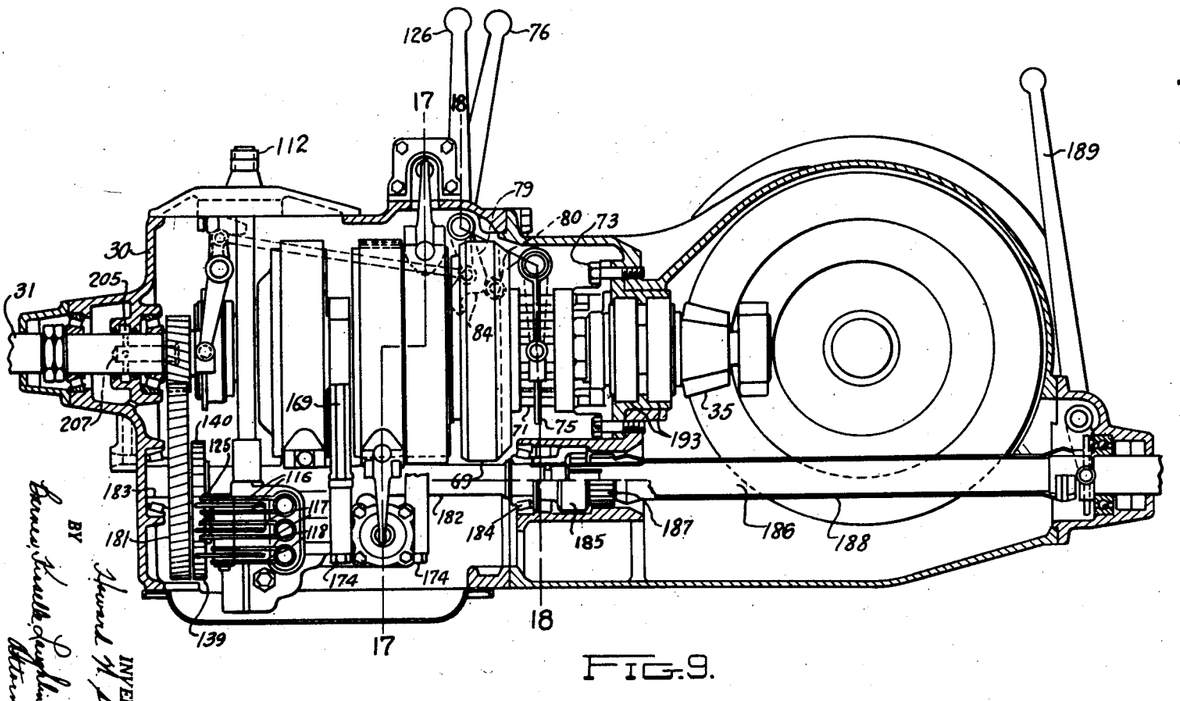
Fig. 9 is a longitudinal side elevation of my planetary transmission with the differential shown in vertical section.

In order for the operator to be able to make a positive shift at any time it is necessary to apply pressure to this pin clutch and brake through the medium of a spring, as shown in Fig. 18. If the shift lever 76 were connected directly to the shifter ring, in some cases the shift could not be completed because the pins would abut against the metal between the holes of the adjacent member, but with the arrangement shown in Fig. 18 and the longitudinal elevation, Fig. 9, a shift can be made either to underdrive or direct at any time. If the pins abut on the web of the adjacent member 72 when shifting to underdrive, a spring pressure is merely built up and the shift occurs as soon as slight relative rotation takes place between the members to be joined together since the pins are pushed into place when the holes come into register. The torsion spring 77 is shown at the left hand side of Fig. 18 and exerts a pressure at all times on the shifter fork 78 thus throwing the clutch into direct drive when lever 76 is pulled backward. When underdrive is desired, the hand lever 76 is pushed forward which moves the cam 79 against a roller 80 mounted on a small lever 81 which is pivoted loosely on the cross shaft 82 of the shifter fork. Fig. 9 shows the hand lever and clutch in mid or neutral position but this would only occur during the shift as the springs hold the lever in either one extreme position or the other but never in neutral. This small lever operates another torsion spring 83, shown at the right hand side of Fig. 18, which builds up a torsion on the shifter fork sufficient to overcome the torsion exerted by the left hand spring 77. The hand lever is shifted far enough for the roller to drop into the notch 84 on the cam and this notch holds the lever in position and through the springs holds the brake in underdrive position. If the pins abut on the metal between the holes, it does not prevent the shift being made as far as the hand lever is concerned. The main clutch (not shown) must, of course, be released by the operator and when the clutch is re-engaged, if the pins have not seated in the driving holes, then the first few degrees of rotation in the parts allows them to jump into place without any additional movement of the hand lever. The planet pinions in all of the planetary gear trains all run on needle roller bearings.

The brakes 93, 94, 130 are adjustable to give a suitable running clearance when released and the spring in the bands themselves make them self-opening. A minimum amount of slippage occurs while the brake is being applied as the bands are full wrapping or self-energizing. Consequently wear occurs slowly, but adjustment is provided to not only take up wear but to adjust the brakes to proper running clearance when new. This is provided by threading the yoke 90, Fig. 17, which acts as the fulcrum of the brake operating levers 91. The stem of this yoke is threaded into a sleeve nut 92 which shoulders on the transmission case 30 and extends through the wall of the case so it can be adjusted with a wrench. As wear occurs a greater movement of the pistons is required to apply the brakes. Eventually a point would be reached where the piston travels the full length of the stroke without taking up all the clearance in the brake and applying the brake. Before the point is reached the fulcrum of the lever can be moved inward to restore the original condition. Sufficient adjustment is provided to allow for all the possible wear in the brake lining. The low-reverse brake bands 93 and 94 are operated by opposed pistons 95, 96 within a cylinder 97 and a plurality of compression springs 98 sandwiched between the pistons 95 and 96. Pistons 95 and 96 are connected to the brake operating levers 91 which in turn are connected to the brake ears 99 by arms 100. The low-reverse speed brakes 93, 94 are applied by spring pressure and released by oil pressure, Fig. 17.

Figure 17:
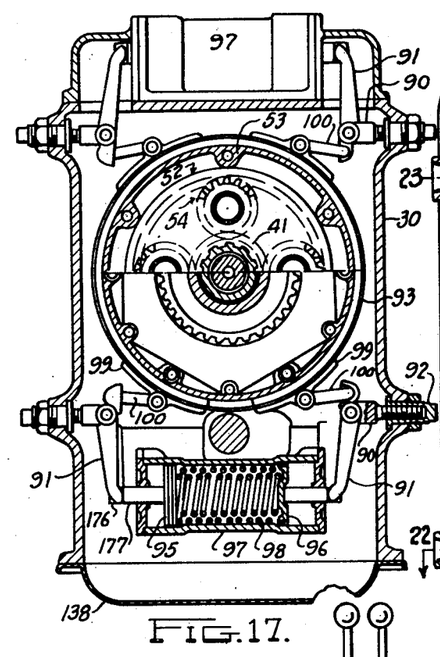
Fig. 17 is a section along the line 17—17 of Figs. 8 and 9.

In Fig. 17 there appears to be four ears on the brake band but the two lower ears are on one band 93 and the two upper ears are on the other band 94 which is along side of the first one. The two brakes work in unison at all times because they are both connected to the same oil passage outlet from the low-reverse valve 101. In Fig. 17 the brake is shown applied and with the brake drum tending to rotate counterclockwise. This has caused both bands to move slightly in a counterclockwise direction and push the lower right hand and upper left hand pistons into their cylinders against the two shoulders in these cylinders. This causes the above-mentioned pistons to act as anchor points for the two brake bands. The remaining two pistons are shown to be moved outward slightly under the influence of the springs. The movement outward is only sufficient to take up the running clearance of the brake bands on the drums. As the brakes wear, the outward movement increases until the piston goes clear to the cylinder head, at which time, in the life of the transmission, it becomes necessary to adjust the fulcrum of the brake levers inwardly.

The above-mentioned application of the brakes resisting the drum rotating counterclockwise or engine-wise is the condition which obtains during reverse drive. During first or low speed drive, however, the torque applied to the transmission tends to turn the low-reverse brake drum clockwise in Fig. 17 or opposite engine rotation. When this occurs and the speed changing valve 101 has been turned to first speed, the left lower piston in Fig. 17, and the right upper piston become anchor points and the other two pistons become the working elements. In other words, the application of the brake through the medium of the springs is exactly the same in both low and reverse but the construction is such that one end or the other of the brake bands become the anchor points depending upon the direction of rotation. The application of the brake is rapid as it occurs as soon as the spring can expel the oil.

Two separate brake bands are used on the single low-reverse drum to obtain a balanced condition, but this is not necessary in the case of second speed as the second speed brake is only required to hold about one-third of the engine torque whereas the low-reverse brake holds slightly more than engine torque. The force applied on the wrapping band is multiplied by the self-energizing action so that the load on the anchor end of the band is about twice the load on the other end. This unbalanced condition causes a radial load on the bearings of the brake drum but by having two brake bands with the ears on opposite sides of the transmission center, the force caused by one brake band is balanced by the force of the other one. A small couple remains, due to the brake bands being in different planes, but these forces are negligible. In the case of the second speed brake another reason it is only necessary to have one brake band is that this brake drum runs on bushings having an ample area and spread.

Figure 8:
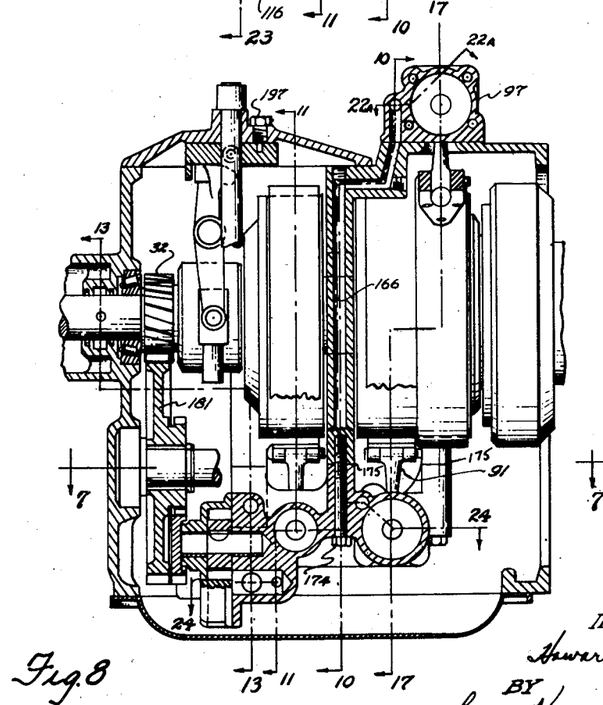
Fig. 8 is a section along the line 8—8 of Fig. 7 and Fig. 22.
Figures 10, 11, 12, 13, 14, 15, 16:
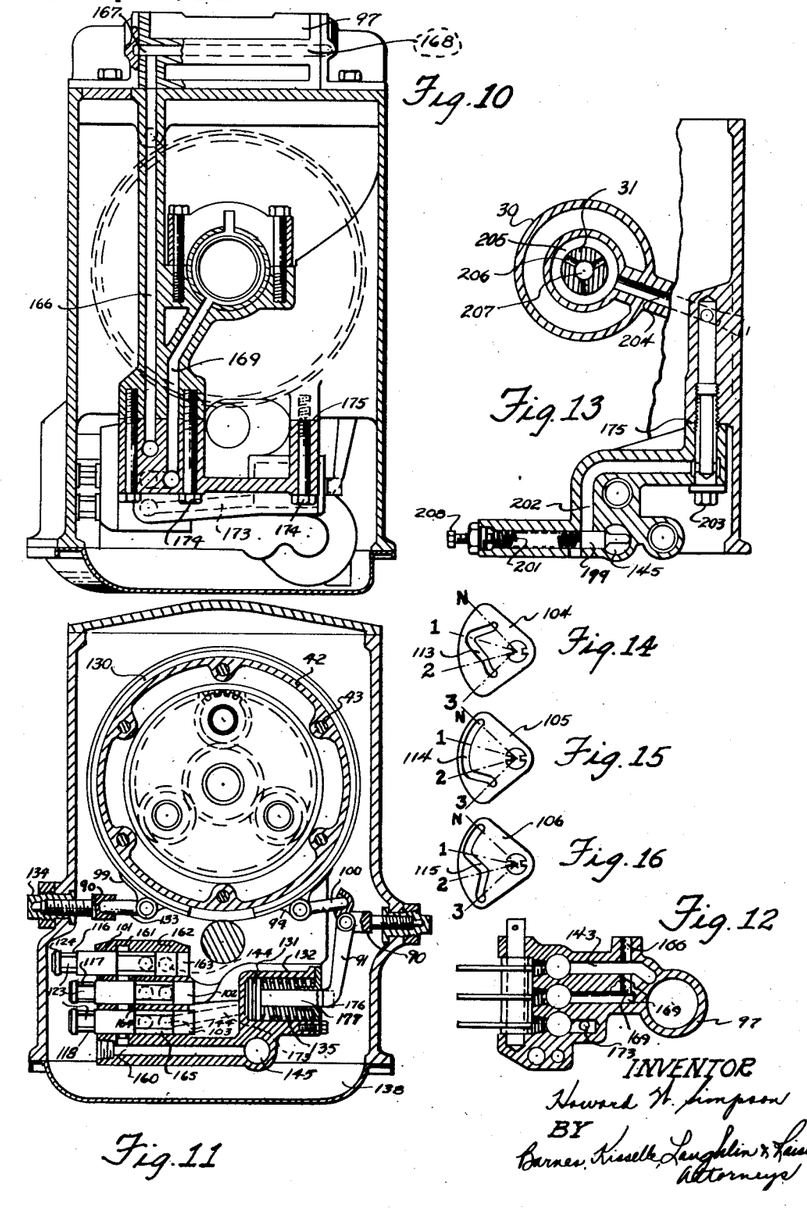
Fig. 10 is a section along the line 10—10 of Figs. 7 and 8.
Fig. 11 is a section along the line 11—11 of Figs. 7 and 8.
Fig. 12 is a section along the line 12—12 of Fig. 7.
Fig. 13 is a section along the line 13—13 of Fig. 8.
Figs. 14, 15 and 16 are plan elevations respectively of the low and reverse, third, and second speed cams.

The speed changing valve mechanism consists of three spool valves 101, 102 and 103, Fig. 11. Valve 101 is the low-reverse speed valve. Valve 102 is the third or high speed valve and valve 103 is intermediate or the second speed valve. These valves are each controlled by a cam plate. The low-reverse valve cam plate is referenced 104, the third speed valve cam plate 105, and the second speed cam plate 106, Figs. 14 to 16. These three cam plates are all keyed to a vertical rod 180, Fig. 23, an extension of which, 107, passes up through the top of the cover plate. The speed changing valve extension has a disc 195 pinned to it which has four notches in its periphery. A spring loaded detent 196, Figs. 22 and 23, snaps in and out of the notches when the shaft 107 is turned and thus locates the valve cams accurately in each speed position. A stop screw 197, Fig. 8, fits into curved groove 198, Fig. 22, and the ends of the groove stop against the screw to limit movement of the valve and thus prevent danger of bending the valve operating parts or moving the cams too far in either direction. These three plates move in unison and are connected to the hand lever 108 on the steering column by means of rod 109, crank 110, Bowden wire 111 and crank 112, Fig. 3. These three cam plates can be moved to four positions; namely, neutral, first, second and third. The cam plates 104, 105, 106 are provided with cam slots 113, 114 and 115 respectively. These cam plates control the spool valves each by means of double bell crank levers 116, 117 and 118 respectively.

Figure 23:
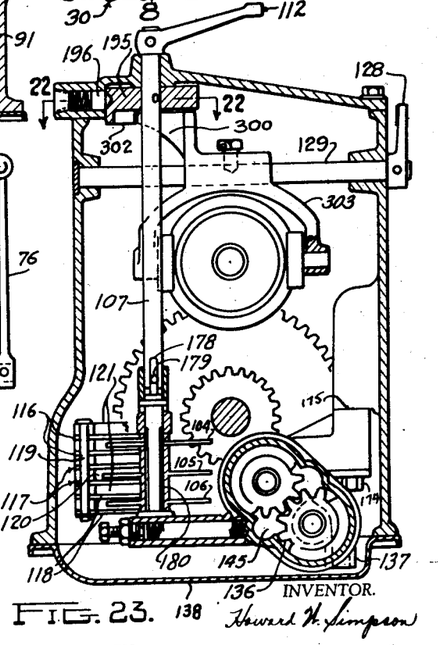
Fig. 23 is a double section along the line 23—23 of Figs. 7 and 22.

Each bell crank comprises two stampings pivoted on spindle 119 and spaced by bushings 120, Fig. 23. Spindle 119 is supported upon brackets 121 which have a screw fit in the valve housing 122. The spool valves are each provided with a neck portion 123 terminating in enlarged heads 124. The bell crank lever sets 116, 117 and 118 engage their respective spool valves on either side of the neck portions 123, Fig. 11. Thus, as above described, one end of each of the bell cranks 116, 117, 118 engage the necks of spool valves 101, 102, 103, respectively, and the other ends of the bell cranks are connected together by three vertically extending pins 125 which pass through and slidably engage respectively the cam slots 113, 114 and 115.

Figure 7:
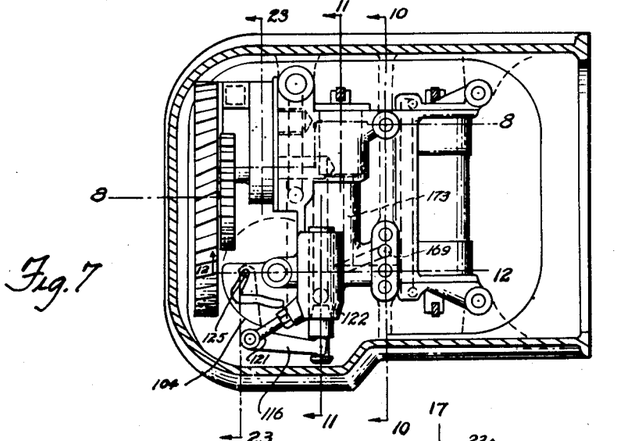
Fig. 7 is a section along the line 7—7 of Fig. 8.

Referring to Figs. 14, 15 and 16, the neutral, first, second and third speed positions of the pins 125 in the cam slots are indicated by the legend N, 1, 2, 3, and the radius lines. In neutral, second and third speeds cam plate 104, which controls low speed spool valve 101, holds the spool valve in the position shown in Fig. 7. When the cam plates are rotated so that top or low speed cam plate 104 is in the position shown in Fig. 24, the oil in the low-reverse cylinders 97 is free to flow out which causes the springs 98, Fig. 17, to push the two pistons 95 and 96 in the upper and lower cylinders apart, which applies two separate brake bands 93 and 94, Figs. 1 and 17, on the low-reverse drum.

Figures 3, 4, 5, 6:
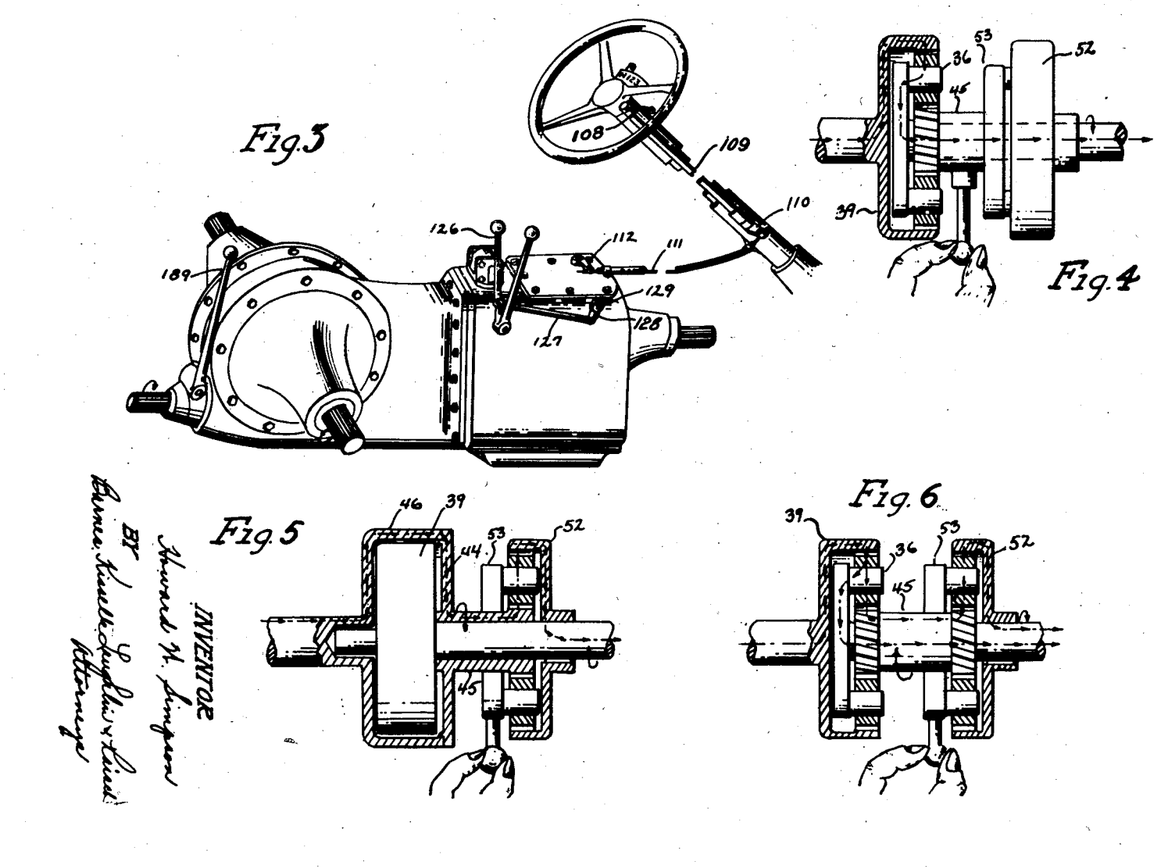
Fig. 3 is a perspective showing the finger tip speed control on the steering column as well as the underdrive, reverse and power take off shift levers.
Figs. 4, 5 and 6 are illustrative drawings showing the second, reverse and low gear drive.

The first speed position of valve 101 is also the position of this valve for reverse speed and reverse speed must be further selected by use of a hand lever 126 on the transmission which acts through link 127, lever 128 and shaft 129, Fig. 3, to shift internal clutch 190 at the front end of the transmission into mesh with either the ring gear 39, 50, 51 of the front gear set for all forward speeds or shifts into mesh with teeth 47 cut on the flange 46 bolted to the front side of the brake drum in order to obtain reverse speed. In Fig. 1 the forward and reverse shift ring 48 is shown in neutral position and there is also a neutral position in the hand lever 108 on the steering wheel. It is desirable to have these two neutral positions from the standpoint of easy control. The speed changing valve can be moved to any position without releasing the engine clutch (not shown) and consequently it is desirable to have a neutral position so that the tractor can be stopped and started simply by using this lever as it is not necessary for the driver to release the engine clutch. The neutral position in the forward and reverse shift is desirable as it allows the whole transmission to be thrown out of gear when, for instance, the power take off alone is being used for driving a belt pulley for stationary power. The forward-reverse lever is ordinarily used only when maneuvering a tractor in reverse and for all forward speeds it is moved to the forward position and left there.

The second speed brake band 130, Figs. 1 and 11, is applied by means of hydraulic or oil pressure acting against piston 131 in cylinder 132. Piston 131 is connected by a lever 91 pivoted to yoke 90 and link 100 to ear 99, Fig. 11, in the same manner as above described with respect to the low-reverse brake bands. The other end of the second speed brake band 130 is anchored by means of an ear 99, link 133 and a yoke 90 in which link 133 pivots. Yoke 90 is threaded into a hollow sleeve nut 134 which is screwed into the transmission housing. When the oil pressure is released the brake band 130 is retracted by compression spring 135.

Figures 21, 24:
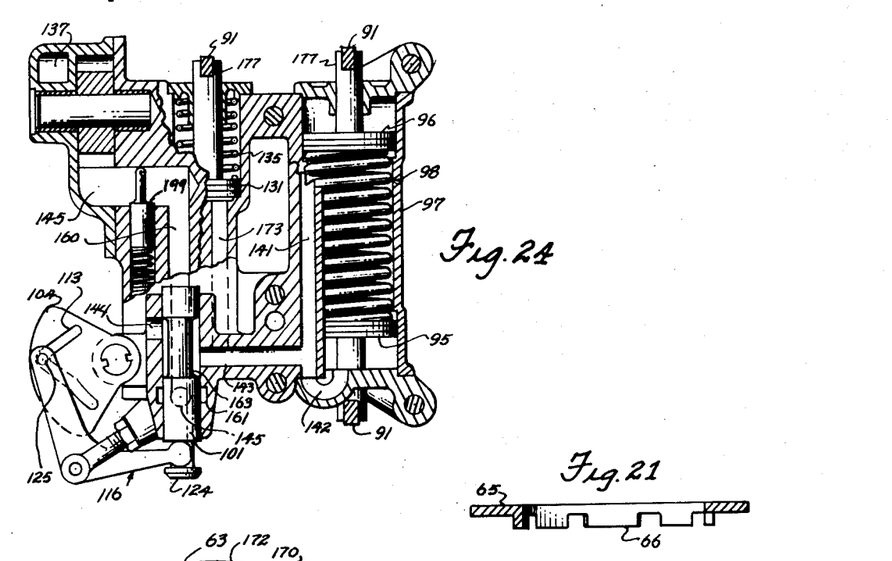
Fig. 21 is a section along the line 21—21 of Fig. 20.
Fig. 24 is a section along the line 24—24 of Fig. 8.

The fluid under pressure which is used for operating the hydraulic brakes and clutch is supplied by means of gear pump 136 having an oil inlet 137 into the bottom pan 138 of the transmission housing which acts as an oil sump. Gear pump 136 is so located that the pump driving gear 139, Fig. 9, meshes with a set of teeth 140, cut on the power take off gear, when the hydraulic unit is bolted to the main housing. Figs. 13 and 24 show oil pressure passage 145 into which an overload pressure piston 199 extends. Whenever pressure exceeds the number of pounds exerted by spring 201 the piston 199 is moved against the spring until it uncovers port 202. This feeds oil through hollow cap screw 203 and connecting passage 204 to circumferential passage 205 where the oil enters shaft 31 through holes 206 and flows along the central hole 207 to lubricate the various parts of the transmission. Screw 208 is used to adjust the spring pressure and thus controls the maximum oil pressure. When the cam plates are rotated so that the top plate, which is the low-reverse cam plate, is in the position shown in Fig. 24, the valve 101 is in the position shown in Fig. 24, so that the oil in cylinders 97 is free to be exhausted from behind pistons 95, 96 through converging passageways 141 and 142, passageway 143 through the spool valve and thence through outlet 144 into the sump or reservoir 138, Fig. 24. This permits springs 98 to apply the low-reverse brakes. At this time valve 101 shuts off the high pressure line 145 from the pump. The speed with which the low-reverse band is engaged can be varied by varying th area of the outlet hole 144.

The rear end of the transmission comprises the rear axle housing 146, the tubular rear axle shafts 147, 148, a differential comprising a ring gear 149 in mesh with driving pinion 35, pinions 150 on spider 151 mounted in differential housing 200, stub shafts 152 and 152' each having a beveled gear 153 at their inner ends in mesh with the differential pinions 150, and a helical gear 154 and 154' at the other end which constitutes the sun gear of a planetary transmission. The ring gears 155 are stationary ring gears and mounted internally of the housing 146. The planet carriers 156 are integral with the inner ends of axle shafts 147 and each supports three planet gears 157 in mesh with ring gears 155 and sun gears 154. Sun gears 154 and 154', planet gears 157, ring gears 155 are all helical gears. The differential ring gear 149 is supported within housing 146 upon roller bearings 158 and 159. The stub shafts 152 are journaled within the differential housing 200.

Figure 25:
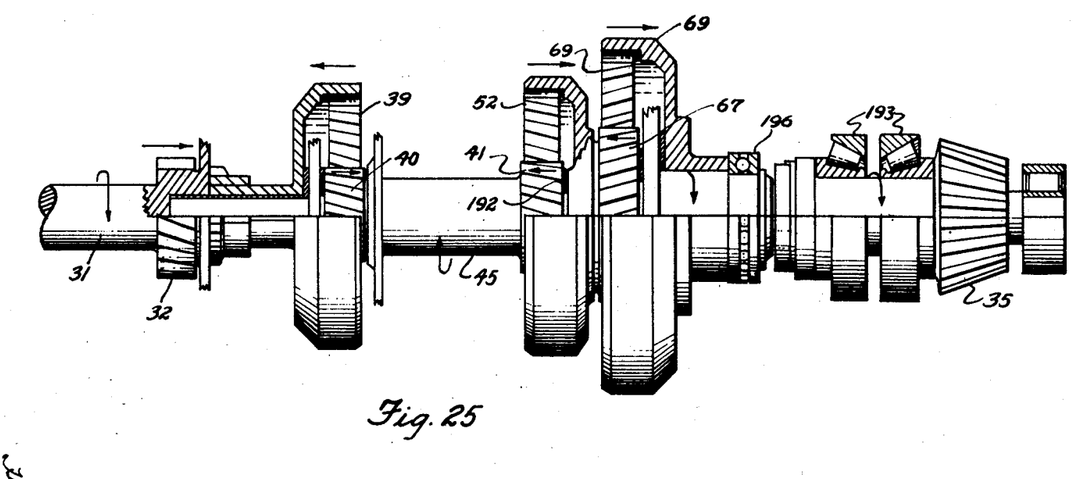
Fig. 25 is a fragmentary longitudinal section through the planetary transmission with the planet gears omitted showing the hand and the thrust loads of the gears and the balancing or counteracting of the same.

Helical gears are often avoided by designers because of the end thrust loads, even though the helical gears are stronger and run more quietly. In my transmission end thrusts of the gears are largely balanced or cancelled out by opposing thrusts from adjacent gears cut on the same blank or attached. In the case of the front ring gear 39, Fig. 1, part of the thrust is balanced by the power take off gear. The roller bearings at the front part of the transmission are ample to take care of the full thrust of this gear when the power take off is not in use. An end thrust produced at sun gear 40 is toward the right, Figs. 1 and 25, and is balanced by an approximately equal thrust toward the left at sun gear 41 when both gears are working. In second and fifth speeds, however, only sun gear 40 is working in which case thrust washer 192 carries the load. This thrust is then balanced by the leftward thrust from sun gear 67 through washer 192 so that no end thrust is transmitted to members further to the right than sun gear 67. In the same way a thrust to the right produced at ring gear 52 is balanced by a leftward thrust produced by sun gear 67 except in second and fifth speeds as described above in which case the leftward thrust of sun gear 67 is balanced by the rightward thrust produced by sun gear 46. Also the end thrust to the right produced by ring gear 69 is balanced by the leftward thrust produced by the bevel pinion 35 so that bearings 193 only have to carry radial loads produced by the pinion but no end thrust. The thrust from ring gear 69 is transmitted through thrust bearing 196 and lock ring 197 to the splined hub of carrier 68 and from the carrier through washer 198 to the end of the drive shaft 34.

The side gear thrusts of differential gears 150 are balanced by opposing axial thrusts from the helical sun gears 154 and 154' of the two final planetary drives. This is especially desirable in a tractor since steering brakes are used which cause the differential gears to rotate at relatively high speeds when one of the tractor wheels is held stationary for a sharp 180 degree turn, as when cultivating row crops. In the axle, as shown, I use a helix angle of 24 degrees in the final drive planetary gears and thus inward end thrusts are obtained which balance the outward thrusts of the differential gears so they can rotate freely. By thus permitting them to float the tractor offers very little resistance to quick 180 degree turns and is easy to handle.

Figure 19:
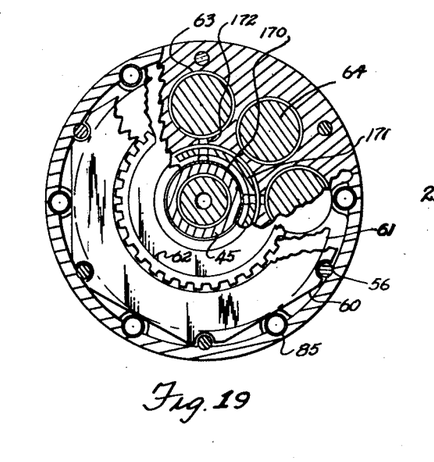
Fig. 19 is a vertical section showing details of the clutch in the second set of planetary gears.
Figure 20:
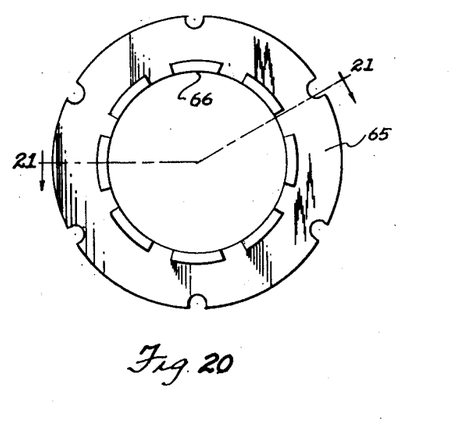
Fig. 20 is an elevation of the clutch presser plate shown in Fig. 1.

The pressure outlet from the pump is referenced 145. The oil passes from outlet 145 along the passageway 160 to chamber 161 which extends vertically in the valve body 162 about all of the spool valves, Figs. 11 and 24. Pressure chamber 161 communicates with the cylinders for all of the spool valves. The low-reverse spool valve cylinder is referenced 163, the third speed valve cylinder 164 and the second speed cylinder 165. Cylinder 163 connects with the lower brake cylinder 97 through passageways 143, 141 and 142 and with the upper, lower and reverse cylinder 97, Fig. 8, by means of passageway 166, Fig. 10, and branch passageways 167 and 168 which go to the opposite ends of the upper cylinder 97. Cylinder 164 for the third speed spool valve communicates with passageway 169 (Figs. 1, 12) which communicates with circumferential chamber 170 in bearing sleeve 171, Fig. 1. Chamber 170 communicates through passageways 172 with cylinders 63 in front of the piston 64, Figs. 1 and 19. Cylinders 163, 164 and 165 are each provided with an exhaust port 144 back to the oil reservoir 138. Second speed spool valve cylinder 165 communicates with brake cylinder 132 by means of passageway 173, Figs. 11 and 12.

The valve assembly, the lower low and reverse speed brake cylinder, the second speed brake cylinder, and the pressure pump are all mounted as a unit and secured by cap screws 174 to a machined surface 175 on the lower side of the transmission case.

The brake levers 91 remain in the housing when the hydraulic unit is disassembled. The lower end of the brake levers 91 fit into the bifurcated ends 176 of the piston rods 177, Figs. 11 and 17, so that when the hydraulic unit is assembled or disassembled from the housing the levers 91 slip into and out of the bifurcated ends of the piston rods. The lower end of cam operating shaft 107 is provided with a slot 178 which fits over a pin 179 in the upper end of cam plate shaft 180 so that in the disassembling of the hydraulic unit pin 179 slips out of slot 178 to disconnect the shafts 107 and 180.

The helical gear 32 cut on the rear end of the drive shaft 31 is continuously in mesh with a power take off gear 181 mounted on power take off shaft 182, Fig. 9. The power take off shaft is mounted on roller bearings 183 and 184. An internal clutch 185 is mounted on the rear end of the power take off shaft 182. The rear power take off shaft 186 is piloted on the end of the front power take off shaft 182 and a clutch 187 is splined on the front end of the power take off shaft 186 and is arranged to be shifted into and out of engagement with the clutch 185 by means of a tube 188 mounted over shaft 186 and shiftable fore and aft by means of the power take off lever 189.

In neutral the shifter ring 48 and the internal clutch 190, which is splined on the cupped end 49 of the drive shaft 31, is in the position shown in Fig. 1 and thus disengaged from teeth 47 on the flange of the second speed brake drum and is also disengaged from the clutch teeth on ring 50. In this condition the drive shaft 31 and the power take off shaft are turning but the drive from the drive shaft 31 is not transmitted to any of the driven parts in the planetary transmission of the drive shaft.

Another neutral is achieved by the hydraulic control irrespective of whether the internal ring 190 is moved forward into forward position or rearwardly into reverse drive position. The neutral position of the spool valves are illustrated in Fig. 11. At this time the second speed brake cylinder 132 is exhausted so that the second speed brake 130 is not being applied and oil under pressure is admitted to the low-reverse cylinders 97 so that the low-reverse brake is not being applied and also the oil is exhausted from cylinders 63 so that clutch discs 60 and 61 are disengaged and there is no direct drive. Hence, under this condition if ring clutch 190 is shifted forwardly into engagement with ring 50, then ring gear 39 acts through planets 37 to rotate sun gears 40 and 41 in a reverse direction. Since the ring gear 52 is connected by means of sun gear 67, planets 70 and carrier 68 with the output shaft 34 and thence through the rear end drive to the wheels, ring gear 52 offers a resistance and causes the carrier 53 to rotate in a reverse direction. If ring clutch 190 is shifted rearwardly into engagement with teeth 47, then the sun gears 40, 41 rotate forwardly and act through the planets 37 to rotate the internal gear 39 backwardly and act through planets 54 to rotate the rear carrier 53 forwardly. Therefore, unless one of the brakes or the clutch are engaged there is no drive through to the output shaft with the forward-reverse shift in either position. In all forward speeds ring clutch 190 is shifted forwardly into mesh with gear 50 splined on the hub of the forward ring 39.

In high or third speed, valve 101 will be in the position illustrated in Fig. 11 so that oil under pressure is admitted to the low-reverse brake cylinders 97 and remains under pressure the same as in neutral and no braking action is applied on the low-reverse brake drum 42. The second speed valve 103 remains in the same position as for neutral, Fig. 11, and no braking effort is applied to the brake drum 42. Third speed valve 102 is shifted to the left from the position shown in Fig. 11 so that oil under pressure is admitted through the passageways, above recited, to cylinders 63 forward of pistons 64 thereby engaging the multiple disc clutch 60, 61 and connecting together sun gear 41 and planet carrier 53. Thus, the drive is from drive shaft 31 through ring clutch 190 to the internal ring gear 39. Clutch 60, 61 locks sun gear 41 to carrier 53 which thereby also prevents relative rotation of ring gear 52. Since ring gear 52 is splined to shaft 33 of which carrier flange 36 is an integral part and since sun gears 40 and 41 are splined together, therefore it is obvious that sun gear 40 is locked to carrier 36 and that there can be no relative rotation between ring gear 39 and planet 37. Hence, both planetary systems rotate together as a solid mass with shafts 31 and 33, the same as though the drive were direct from shaft 31 to shaft 33 to sun gear 67.

In second speed spool valve 103 is shifted to the left from the position shown in Fig. 11 thereby admitting oil under pressure through line 173 into the second speed cylinder 132 thereby applying the brake to the second speed drum 42. At this time the other two valves 101 and 102 remain as in neutral with the multiple disc clutch 60, 61 disengaged and the low-reverse brake 93, 94 is retracted so that the low-reverse drum 57 is free to rotate. The application of brake 130 holds the sun gears 40, 41 stationary and ring gear 39 rotates the planets 37 about the fixed sun gear which in turn rotates the carrier 36 at a reduced speed. The carrier 36 is an integral part of shaft 33 which is splined to the internal gear 52 which is integral with the sun gear 67 so that the drive is from the sun gear 67 through the underdrive planetary system to the output shaft 34. The drive for second gear is diagrammatically illustrated in Fig. 4.

In low speed valve 101 is shifted to the right from the position shown in Fig. 11 so that it is in the position shown in Fig. 24 with the oil being exhausted from cylinders 97, permitting the springs 98 to apply the brake to drum 57. The position of valves 102, 103 will be the same as in neutral so that the second speed brake 130 is not applied and the multiple disc clutch 60, 61 is disengaged. The drive will now pass from the drive shaft 31 through ring clutch 190 to ring 50 and thence to ring gear 39. The ring gear 39 acts through planets 37 to rotate the sun gears 40 and 41 backwards because at this time the sun gear 41 is disengaged from the planet carrier 53. The sun gear 41 acts through planets 54 to rotate ring gear 52 forwardly. A part of the drive, in the specific illustration approximately forty-one percent (41%) of the torque, is applied through ring gear 52 to the underdrive and thence to output shaft 34. The major portion of the torque, approximately fifty-nine percent (59%) in the specific illustration, is through the carrier flange 36 direct to the shaft 33 and thence through the sun gear 67 to the underdrive shown diagrammatically in Fig. 6.

In reverse the position of the valves 101, 102 and 103 are the same as in low but the ring clutch 190 is shifted rearwardly into engagement with the teeth 47 on flange 46 of the second speed brake drum. This by-passes the torque around the second speed planetary gears, through hollow shaft 45 to the rear sun gear 41 which acts through planets 54 to rotate the ring gear 52 backwards (because the carrier 53 is braked). Sun gear 67 is integral with gear 52 and therefore also rotates backwards. The power is then transmitted from the ring gear 52 to the underdrive of the output shaft 34. Since ring gear 69 is either held against rotation by pin clutches 71, as shown in Fig. 1, or rotates with the planet carrier 68 of the underdrive when the pin clutch 71 is shifted forward, the carrier 68 always rotates in the same direction as the gun gear 67. The reverse drive is shown illustratively in Fig. 5.

The above described three speeds and reverse provide first, second, third and slow reverse speeds when the underdrive is effective as a reduction gear. When the underdrive is in direct drive, fourth, fifth, sixth and fast reverse speeds are obtained.

Figure 22:
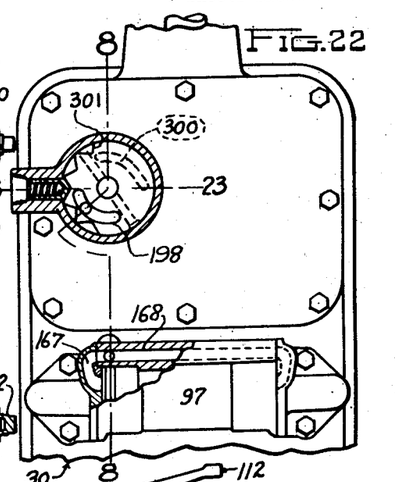
Fig. 22 is a plural section taken along the line 22—22 of Fig. 23 and line 22A—22A of Fig. 8.

To prevent shifting of ring clutch 190 into reverse position, that is, into mesh with teeth 47 when the hydraulic valve control has placed the transmission into second or third speeds, I have provided an arcuate flange 302 on the lower side of disc 195 which terminates in a shoulder 301, Figs. 22 and 23. On the shifter yoke 303 I have placed a lug 300. Shifter yoke 303 tilts about shaft 129 in shifting ring clutch 190 into forward and reverse speeds. When the reverse clutch 190 is shifted into reverse position, lug 300 abuts stop 301 and thus prevents the shifting of the valves into second or third speed. As shown in Fig. 22, the valves and disc 195 are in first position. Since first speed and reverse positions of the transmissions are the same except that clutch 190 is shifted forward for low and rearwardly for reverse, therefore this interlock is only necessary for second and third speeds.

I claim:

1. A variable speed transmission comprising two sets of planetary gears, each set comprising an internal gear, a sun gear, and a planet gear carrier and a plurality of planet gears on said carrier and in mesh with the sun and internal gears, the sun gears, internal gears and carriers of said sets being rotatable about the same axis, a driving connection between the sun gears, a power input shaft, an output shaft, a brake for the planet gear carrier of the set adjacent the output shaft, and means for optionally connecting the power input shaft either to the internal gear of the planetary set adjacent the input shaft for obtaining a forward speed or for connecting the power input shaft to the sun gear of the planetary set adjacent the output shaft for obtaining a reverse rotation of the output shaft when the carrier of the last mentioned set is braked.

2. A variable speed transmission comprising two sets of planetary gears, each set comprising an internal gear, a sun gear, a planet gear carrier, and a plurality of planet gears mounted on said carrier and in mesh with the sun and internal gears, the sun gears, internal gears and carriers of said sets being rotatable about the same axis, a driving connection between the sun gears, a driving connection between the planet carrier of the set adjacent the input shaft and the internal gear of the other set of planetary gears, a power input shaft, an output shaft, a brake for the planet gear carrier of the set adjacent the output shaft, and means for optionally connecting the power input shaft either to the internal gear of the planetary set adjacent the input shaft for obtaining a forward speed or for connecting the power input shaft to the sun gear of the planetary set adjacent the output shaft for obtaining a reverse rotation of the output shaft when the carrier of the last mentioned set is braked.

3. A variable speed transmission comprising two sets of planetary gears, each set comprising an internal gear, a sun gear, a planet gear carrier, and a plurality of planet gears mounted on said carrier and in mesh with the sun and internal gears, the sun gears, internal gears and carriers of said sets being rotatable about the same axis, a driving connection between the sun gears, a driving connection between the carrier of the set adjacent the input shaft and the internal gear of the other planetary set, a power input shaft, an output shaft, a brake for the planet gear carrier of the set adjacent the output shaft, and means for optionally connecting the power input shaft either to the internal gear of the planetary set adjacent the input shaft for obtaining a forward speed or for connecting the power input shaft to the sun gear of the planetary set adjacent the output shaft for obtaining a reverse rotation of the output shaft when the carrier of the last mentioned set is braked.

4. The combination as set forth in claim 3 including means for selectively braking the sun gear and for selectively braking the planet carrier of the planetary gear set remote from the power input shaft whereby when the power input shaft is connected to the internal gear of the planetary set adjacent the input shaft, the planet gear carrier of the remote set is braked, and the sun gear brake is released, then a low forward speed of the output shaft is obtained and whereby when the power input shaft is connected to the sun gear of the planetary set adjacent the output shaft, the planet gear carrier of the remote set is braked, and the sun gear brake is released, then reverse rotation of the output shaft is obtained.

5. A variable speed transmission comprising two sets of planetary gears, each set comprising an internal gear, a sun gear, a carrier, and a plurality of planet gears on said carrier in mesh with the sun and internal gears, a driving connection between the sun gears, a power input shaft, an output shaft, a driving connection between the output shaft and the internal gear of the planetary set remote from the input shaft and between the output shaft and the carrier of the set adjacent the input shaft, means for connecting the power input shaft to the internal gear of the planetary set adjacent the input shaft, and means for retarding rotation of the planet carrier for the set remote from the input shaft whereby a portion of the torque is delivered from the input shaft through the first set directly to the output shaft and the remaining portion of the torque is delivered through both sets to the output shaft.

6. A variable speed transmission comprising two sets of planetary gears, each set comprising an internal gear, a sun gear, a carrier, and a plurality of planet gears on said carrier in mesh with the sun and internal gears, a driving connection between the sun gears, a power input shaft, an output shaft, a driving connection between the output shaft and the internal gear of the planetary set remote from the input shaft and between the output shaft and the carrier of the set adjacent the input shaft, means for connecting the power input shaft to the internal gear of the planetary set adjacent the input shaft, a brake for holding the planet carrier for the set remote from the input shaft against rotation whereby a major portion of the torque is delivered from the input shaft through the first set directly to the output shaft and the remaining portion of the torque is delivered through both sets to the output shaft.

7. A variable speed transmission comprising two sets of planetary gears, each set comprising an internal gear, a sun gear, a carrier, and a plurality of planet gears on said carrier in mesh with the sun and internal gears, a shaft upon which the sun gears are fixed so that they always simultaneously rotate or remain stationary, a power input shaft, an output shaft, a driving connection between the output shaft and the internal gear of the planetary set remote from the input shaft and between the output shaft and the carrier of the set adjacent the input shaft, means for connecting the power input shaft to the internal gear of the planetary set adjacent the input shaft, and means for retarding rotation of the planet carrier for the set remote from the input shaft whereby a portion of the torque is delivered from the input shaft through the first set directly to the output shaft and the remaining portion of the torque is delivered through both sets to the output shaft.

8. The combination as set forth in claim 7 including a brake for the sun gear, means for controlling said brakes whereby for second forward speed the brake for the sun gear only is applied and for first or reversed speed the brake for the rear planet carrier only is applied.

9. The combination as set forth in claim 8 including a clutch for optionally connecting the planet carrier of the planetary set remote from the power input shaft and the sun gear whereby, when all of the brakes are released and the clutch is engaged, the planetary sets rotate as a unit to obtain high speed.

10. In a variable speed transmission comprising two sets of planetary gears, each set comprising an internal gear, a sun gear, a planet gear carrier, and a plurality of planet gears on said carrier and in mesh with the sun and internal gears, a driving connection between the sun gears, a power input shaft, an output shaft, a driving connection between the planet carrier of the set adjacent the power input shaft and the internal gear of the set remote from the power input shaft, and means for locking together the carrier and sun gear of one of said sets whereby the gears of the other set are locked together to rotate as a unit.

11. A variable speed transmission comprising two sets of planetary gears, each set comprising an internal gear, a sun gear, and a plurality of planet gears in mesh with the sun and internal gears, a driving connection between the sun gears, a power input shaft, an output shaft, a brake for the sun gears, a brake for the planet carrier of the set remote from the input shaft, and a clutch optionally connecting the planet carrier of one set and the sun gear whereby when the sun gear is braked, the clutch disengaged and the other brake released the output shaft moves forward at a slower speed than the input shaft and when the sun gear brake is released and the other brake applied with the clutch disengaged reverse rotation of the output shaft is produced and when the planet carrier of the set remote from the input shaft is braked and the said clutch and other brake are disengaged both sets of planetary gears are under load and the output shaft rotates at a forward speed slower than the first mentioned forward speed of the output shaft.

12. In a planetary transmission having an input shaft, an intermediate shaft, an output shaft, two helical sun gears, two helical internal gears, a plurality of helical planets coacting with each sun and internal gear, the one sun gear being a driving gear and the other a driven gear and having helices of the same hand whereby the end thrust produced by one sun gear is cancelled by the end thrust of the other sun gear, a helical planetary underdrive gear set comprising an internal gear, a sun gear, and a plurality of planet gears, the sun gear of the underdrive being integral with the internal gear of one of the other planetary sets and having helices of the same hand whereby the sun gear of the underdrive has its end thrust cancelled by the end thrust of said integral internal gear, a bevel pinion on the ouput shaft, a gear driven by said bevel pinion, the end thrust of the bevel pinion being balanced by the end thrust of the internal gear of said planetary underdrive.

13. A variable speed transmission comprising two sets of planetary gears, each set comprising an internal gear, a sun gear, a carrier, and a plurality of planet gears on said carrier in mesh with the sun and internal gears, a shaft upon which the sun gears are fixed so that they always simultaneously rotate or remain stationary, a power input shaft, an output shaft, a driving connection between the output shaft and the internal gear of one planetary set and between the output shaft and the carrier of the other set, means for connecting the power input shaft to the internal gear of the said other planetary set, and means for retarding rotation of the planet carrier for the said one set whereby a portion of the torque is delivered from the input shaft through the said other set directly to the output shaft and the remaining portion of the torque is delivered through both sets to the output set, a brake for the sun gear, means for controlling said brakes whereby for second forward speed the brake for the gun gear only is applied and for first or reversed speed the brake for the planet carrier of the said one set only is applied, and a clutch for optionally connecting two relatively rotating members of one of said planetary sets to lock the members of said last mentioned set against relative rotation whereby the members of the remaining set are also locked against relative rotation and when all the brakes are released and the clutch is engaged the planetary sets rotate as a unit.

14. A variable speed transmission comprising two sets of planetary gears, each set comprising an internal gear, a sun gear, and a plurality of planet gears in mesh with the sun and internal gears, a driving connection between the sun gears, a power input shaft, an output shaft, a brake for the sun gears, a brake for the planet carrier of the second planetary set, and a first clutch optionally connecting two members of one planetary set against relative rotation, a second clutch for optionally connecting the power input shaft to the ring gear of the first set or to the sun gear of the second set whereby when the sun gear is braked, the first clutch disengaged, the input shaft connected to the ring gear of the first set by the second clutch, and the other brake released the output shaft moves forward at a slower speed that the input shaft and when the sun gear brake is released and the other brake applied with the first clutch disengaged and the second clutch connecting the input shaft to the sun gear of the second set reverse rotation of the output shaft is produced and when the planet carrier of the second set is braked and the said first clutch and other brake are disengaged and the second clutch is connecting the input shaft to the ring gear of the first set, both sets of planetary gears are under load and the output shaft rotates at a forward speed slower than the first mentioned forward speed of the output shaft.

15. A variable speed transmission comprising two sets of planetary gears, each set comprising an internal gear, a sun gear, a carrier, and a plurality of planet gears on said carrier in mesh with the sun and internal gears, a shaft upon which the sun gears are fixed so that they always simultaneously rotate or remain stationary, a power input shaft, an output shaft, a driving connection between the output shaft and the carrier of the first of said sets, a driving connection between the output shaft and the internal gear of the second of said sets, means for connecting the power input shaft to the internal gear of the first of said sets, and means for retarding rotation of the planet carrier for the second of said sets whereby a portion of the torque is delivered from the input shaft through the first set directly to the output shaft and the remaining portion of the torque is delivered through both sets to the output set, a brake for the sun gear, means for controlling said brakes whereby for second forward speed the brake for the sun gear only is applied and for first or reversed speed the brake for the planet carrier of the second set only is applied, and a clutch for optionally connecting two relatively rotating members of the one planetary set to lock the members of said set against relative rotation whereby the members of the other set are also locked against relative rotation and when all the brakes are released and the clutch is engaged the planetary sets rotate as a unit.

HOWARD W. SIMPSON.

REFERENCES CITED

The following references are of record in the file of this patent:

UNITED STATES PATENTS

| Number | Name | Date |
|---|---|---|
| 1,132,390 | Royce | Mar. 16, 1915 |
| 1,382,289 | Janicki | June 21, 1921 |
| 1,400,566 | Moorhouse | Dec. 20, 1921 |
| 1,839,088 | Normanville | Dec. 29, 1931 |
| 1,975,835 | Farkas | Oct. 9, 1934 |
| 2,105,755 | Patterson | Jan. 18, 1938 |
| 2,168,033 | Johnston | Aug. 1, 1939 |
| 2,182,386 | Patterson | Dec. 5, 1939 |
| 2,193,304 | Thompson | Mar. 12, 1940 |
| 2,211,413 | Ford | Aug. 13, 1940 |
| 2,214,805 | Baker | Sept. 17, 1940 |
| 2,307,284 | Magee | Jan. 3, 1943 |
| 2,308,082 | Johnson | Jan. 12, 1943 |
| 2,329,724 | Maurer | Sept. 21, 1943 |

FOREIGN PATENTS

| Number | Country | Date |
|---|---|---|
| 28,114 | Great Britain | Dec. 5, 1912 |
| 815,775 | France | July 22, 1937 |